A. DELKESCAMP.
SHEARS AND SCISSORS.

No. 188,601. Patented March 20, 1877.

UNITED STATES PATENT OFFICE.

ADOLPH DELKESCAMP, OF NEW YORK, N. Y., ASSIGNOR OF ONE-HALF HIS RIGHT TO JOHN HERDTFELDER, OF SAME PLACE.

IMPROVEMENT IN SHEARS AND SCISSORS.

Specification forming part of Letters Patent No. 188,601, dated March 20, 1877; application filed February 12, 1877.

*To all whom it may concern:*

Be it known that I, ADOLPH DELKESCAMP, of the city, county, and State of New York, have invented an Improvement in Shears and Scissors; and I hereby declare that the following is a full, clear, and exact description of the same, reference being had to the accompanying drawing, which forms a part of this specification.

My invention relates to that class of shears or scissors which have two movable blades; and it has for its object to provide means applicable to all such shears, whether specially made with my improvement thereon or not, whereby the cutting-edges of the shears may be constantly held in the proper relation with each other, to work in the best manner, the device employed for this purpose also serving in shears of large size, such as tailors' shears, &c., as a boss to hold the shears, when laid down in intervals of use, in such a position that they may be conveniently grasped by the hand.

The invention consists in a combination, with a screw-pivot and spring for holding the edges of the blades pressed together in proper relation, of an independent external spring-box projecting from the side of the shears, and inclosing and compressing said spring, said spring-box being attached to the shears by the screw-pivot thereof, substantially as hereinafter set forth.

Figure 1:
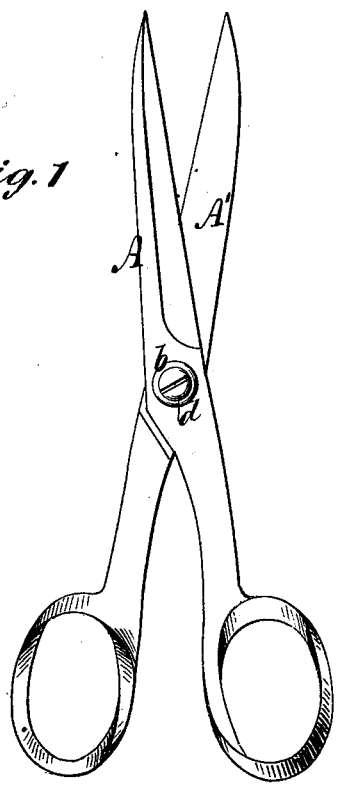
Figure 2:
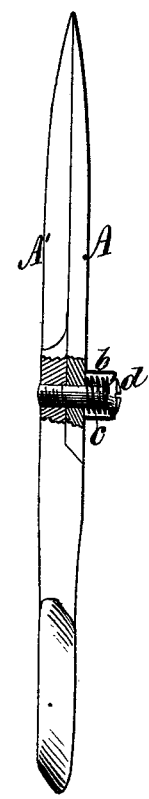
Figure 3:
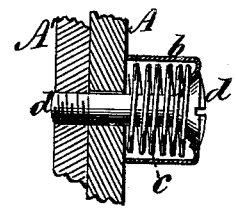

Figure 1 in the accompanying drawing is a side view of shears constructed according to my invention. Fig. 2 is an edgewise view of the same, with a section through the spring, spring-box, screw-pivot, and a portion of the blades. Fig. 3 is an enlarged sectional detail view, showing more plainly the construction and arrangement of the spring, spring-box, and screw-pivot.

My invention is universally applicable to shears or scissors of any kind or pattern, whether made for it or not.

A and A' in the drawing represent the blades of a pair of ordinary shears; $b$, the spring-box; $c$, the spring, and $d$ the screw-pivot, which attaches all the parts together.

Only that part of the screw $d$ which enters the blade A' is male-threaded, the hole in the said blade for the reception of said pivot being correspondingly female-threaded.

The parts are arranged in relation with each other as shown in Figs. 2 and 3, the spring $c$ being compressed against the exterior of the blade A by the spring-box $b$ and screw-pivot $d$, when the latter is inserted, as shown, to hold the edges of the blades together with sufficient, but gentle, firmness, the resilience of the spring taking up the looseness of parts which results from wear in the use of ordinary scissors, and the projecting box $b$ serving in lieu of the ordinary boss employed on tailors' shears and other large shears, to hold the shears in convenient position for grasping when laid upon a table.

The spring $c$ may be made of any requisite length and strength for shears of different sizes, and the box made of any suitable size to inclose said spring, and to perform the function of the boss, as hereinbefore described.

The said spring-box is made of such length relatively to the screw-pivot that it limits the distance to which the blades of the shears can be forced apart, against the action of the spring, said box performing the function of an elongated pivot-head.

I do not broadly claim a spring for holding the cutting-edges of the blades of shears and scissors in proper relation, as this has previously been done; but What I desire to secure by Letters Patent is expressed in the following claim:

The combination, with the screw-pivot $d$ and spring $c$, of the independent external spring-box $b$, inclosing said spring, and attached to the shears by the said screw-pivot, substantially as and for the purposes set forth.

ADOLPH DELKESCAMP.

Witnesses:
BENJAMIN W. HOFFMAN,
FRED. HAYNES.